United States Patent [19]

Deeney et al.

[11] Patent Number: 5,501,827
[45] Date of Patent: Mar. 26, 1996

[54] LASER MARKABLE POLYTETRAFLUOROETHYLENE RESIN MATERIAL AND METHOD OF MAKING

[75] Inventors: Patricia J. Deeney, Lawrenceville, N.J.; David S. Garrison, Yardley, Pa.; David E. Newman, Huntington Station, N.Y.

[73] Assignee: Garlock Inc., New York, N.Y.

[21] Appl. No.: 385,724

[22] Filed: Feb. 8, 1995

Related U.S. Application Data

[63] Continuation of Ser. No. 107,050, Aug. 17, 1993, abandoned, which is a continuation-in-part of Ser. No. 10,979, Jan. 29, 1993, abandoned.

[51] Int. Cl.$^6$ .......................... B29C 47/00; B29C 35/02; C08K 3/22; C08L 27/12
[52] U.S. Cl. .......................... 264/460; 264/211; 264/122; 264/124; 264/172.11; 264/464; 264/482; 264/127; 524/546; 524/430; 524/434
[58] Field of Search .......................... 264/22, 25, 122, 264/124, 127, 211, 174; 524/430, 432, 436, 497, 546; 430/945

[56] References Cited

U.S. PATENT DOCUMENTS

| | | | |
|---|---|---|---|
| 2,685,707 | 8/1954 | Llewellyn | 264/174 |
| 3,793,287 | 2/1974 | Fitz et al. | 524/432 |
| 4,150,008 | 4/1979 | Vassiliou et al. | 524/546 |
| 4,440,879 | 4/1984 | Kawachi et al. | 524/436 |
| 4,753,863 | 6/1988 | Spanjer | 524/497 |
| 4,808,966 | 2/1989 | Ferlier et al. | 338/214 |
| 4,963,609 | 10/1990 | Anderson et al. | 524/432 |
| 4,985,190 | 1/1991 | Ishikawa et al. | 264/122 |
| 4,990,544 | 2/1991 | Asaumi et al. | 524/430 |
| 5,091,284 | 2/1992 | Bradfield | 430/945 |
| 5,111,523 | 5/1992 | Ferlier et al. | 430/947 |
| 5,206,282 | 4/1993 | Williams | 524/433 |
| 5,320,789 | 6/1994 | Nishii et al. | 264/22 |

FOREIGN PATENT DOCUMENTS

| | | | |
|---|---|---|---|
| 0036680 | 9/1981 | European Pat. Off. | B23K 26/18 |
| 0285939 | 12/1987 | Japan | 524/432 |
| 0686438 | 1/1953 | United Kingdom | 264/127 |
| 2215116 | 7/1992 | United Kingdom | H01B 7/36 |

OTHER PUBLICATIONS

Grant & Hackh's Chemical Dictionary, 5th Edition, Mc-Graw Hill Book Company, 1987, pp. 638–639.

*Primary Examiner*—Peter A. Szekely
*Attorney, Agent, or Firm*—Howard S. Reiter; Richard W. Watson

[57] ABSTRACT

A laser markable composite material which when so marked retains good color contrast after heat aging. The material comprises polytetrafluoroethylene resin, photosensitive filler material and an extrusion aid. The photosensitive material is preferably a metal oxide and has a larger mean particle size than typical pigments. Also disclosed is a sequence of milling, mixing and blending steps which forms the desired composite material.

18 Claims, No Drawings

LASER MARKABLE POLYTETRAFLUOROETHYLENE RESIN MATERIAL AND METHOD OF MAKING

This application is a Continuation of Ser. No. 08/107,050, filed Aug. 17, 1993, now abandoned, which is a continuation-in-part of application Ser. No. 08/010,979, filed Jan. 29, 1993, now abandoned.

FIELD OF THE INVENTION

The present invention relates broadly to polytetrafluoroethylene resin based composite materials which, when exposed to an appropriate laser beam, can be encoded with higher contrast markings which are more stable than have previously been available. The invention also relates to the method of making the composite materials.

BACKGROUND OF THE INVENTION

In many instances it is desireable to mark items such as insulated conductors to provide information to persons installing or using such items. Such marking can often be done easily by color coding or by simple printing. As long as the material will accept ink, the only real limit on the amount of information which can be included is the available surface area. However, in the case of items produced from polytetrafluoroethylene (hereinafter "PTFE" throughout the remainder of the specification and the claims), such marking has been difficult due primarily to the physical and chemical attributes of the fluoropolymer. In some instances, colored pigments or dyes have been used, but this means by itself limits the amount of information that can be encoded. Furthermore, color coding may be of little or no use to those persons who are fully or partially color blind.

More recently, efforts have been made to incorporate into PTFE resins photosensitive fillers which react to subsequent laser radiation to produce the desired markings. One such recently developed marking method is described in detail in U.K. Patent 2,215,116. An earlier effort to provide satisfactory laser marking of such resins is described in European Patent Application 256,422. While each of these publications describes materials and processes which have some utility, each also has shortcomings. Thus, European Application 256,422 involves a two-layered insulation in which a portion of the outer layer is laser etched to permit a portion of the inner layer of differing color to become visible. Obviously, making a two-layered material is more difficult, time consuming and costly and, when the marking is done, portions of the outer layer have been physically degraded and are thus less useful as electrically insulating material.

U.K Patent 2,215,116 describes laser marking of a single layer insulation material having a photosensitive filler with minimal material degradation. However, these prior art materials have used filler materials of very small particle size and the results in practice have not been completely satisfactory due to insufficient stability of the color contrast after heat aging.

SUMMARY OF THE INVENTION

These and other difficulties are overcome by providing a PTFE resin material compounded or filled with photosensitive material particles having a controlled particle size between 1 and 12 microns and a mean particle size greater than 3 microns. Preferably the filler is $TiO_2$ particles. The photosensitive material is milled or otherwise comminuted to the desired size and then mixed with a fine powder paste extrudable PTFE resin. The resulting mixture is blended with an extrusion aid after which a preform is formed for subsequent extrusion.

It is thus a primary object of the invention to produce PTFE resin based electrical insulation materials which can be marked by exposure to laser radiation and which will maintain a high degree of color contrast after heat aging. It is a further object to provide such materials which can be so marked without significant damage to the PTFE resin material.

Yet another object is to provide a method for milling and mixing the various ingredients in order to achieve a homogeneous composition of material so that subsequent laser marking will be of substantially uniform contrast throughout the extent of the material.

DETAILED DESCRIPTION OF THE INVENTION

While a variety of laser marking methods and processes have been tried and used in recent years, the results have not been fully satisfactory until the present. We have found that with appropriate materials, preparation and mixing, components may be produced which are simpler in structure and which may be laser marked without significant material damage or degradation and which maintain a high degree of color contrast after heat aging. Accordingly, a preferred material and process will now be described in full detail.

Titanium dioxide ($TiO_2$) of rutile crystal structure with purity greater than 90% is air milled and classified so that the particle size ranges between 1 and 12 microns and the mean particle size is greater than 3 microns. From 2 to 10 parts of the thus milled $TiO_2$ are then mixed by tumbling with 100 parts of a fine powder paste extrudable PTFE, such as T-60 Teflon resin as available from the DuPont Company of Wilmington, Del. The resulting mixture is then air milled to achieve a more uniform dispersion of the $TiO_2$ in the PTFE. One hundred parts of this mixture are then blended with from 10 to 25 parts of a suitable hydrocarbon solvent such as a light petroleum distillate solvent. This step may be carried out in a liquid/solids blender such as a Twin-Shell Liquid-Solids Blender as made by Patterson-Kelley Company of East Stroudsburg, Pa. The resulting mixture is then formed at low pressure into a preform suitable for paste extrusion. The composition by weight of this preform material is about 2–9% $TiO_2$, about 8–23% extrusion aid and the balance PTFE resin. The preform is subsequently loaded into paste extrusion equipment and either extruded directly onto a conductor, extruded into tape or ribbon which may later be slit and wrapped onto a conductor or extruded as tubing. In either case, the composite material is then sintered. The processes and equipment for forming a preform, extruding and subsequent sintering do not comprise a part of the invention, they are well known to those skilled in the art and they need not be explained here in further detail.

It has been found that conductor coverings prepared as described above may be more satisfactorily marked than prior structures upon exposure to laser radiation. The standard material previously available had an initial contrast after laser marking of 48.7% and a final contrast after accelerated heat aging of 25.7%. Material made in accord with our invention has an initial contrast of 57.4% and a final contrast of 52.4% after accelerated heat aging for 234 hours at 260° C. This represents an improvement in initial contrast of more than 15% and an improvement of more than 100% after heat aging as compared to the previous standard material. Stating the improvement in a different way, our material is more stable in that it loses only about 10% of its contrast upon accelerated heat aging, while prior materials have lost nearly 50% of their contrast.

While the invention has been described in detail with respect to a preferred form including PTFE, $TiO_2$ and light petroleum distillate solvent, other modifications will be readily apparent to those skilled in the art of compounding PTFE resins with photosensitive materials. For instance, instead of $TiO_2$, other fillers such as $SnO_2$ or ZnO particles may be used. Other useful extrusion aids include mineral oil, kerosene and naphtha. Thus, the preceding specification should be interpreted as exemplary rather than as limiting and the scope of the invention is defined by the following claims.

We claim:

1. A process for producing a laser markable material particularly useful for electrical cables and insulated conductors, wherein stable markings of substantially uniform, high contrast can be encoded throughout the extent of the material, said process including the steps of:

(a) selecting a particulate photosensitive material having a mean particle size greater than 3 microns;

(b) mixing the photosensitive material particles with a fine powder paste extrudable polytetrafluoroethylene resin;

(c) air milling the mixture produced in step (b) to produce a uniform dispersion of said photosensitive material particles and said fine powder polytetrafluoroethylene resin;

(d) blending the uniform dispersion produced in step (c) with an extrusion aid comprising a hydrocarbon solvent to produce a blend having a composition by weight of 2 to 9% photosensitive material particles, 8 to 23% extrusion aid and the balance polytetrafluoroethylene resin;

(e) forming the blend of step (d) into a preform suitable for paste extrusion; and (f) paste extruding said preform to produce a uniformly photosensitive material-filled polytetrafluoroethylene resin material having a selected configuration to produce said laser markable material.

2. The process described in claim 1, wherein said photosensitive material is selected from the group consisting of $TiO_2$, $SnO_2$ and ZnO.

3. The process described in claim 2, wherein said photosensitive material is $TiO_2$ having a rutile crystal structure with a purity greater than 90%.

4. The process described in claim 1, wherein said hydrocarbon solvent is selected from the group consisting of light petroleum distillate, mineral oil, kerosene and naphtha.

5. The process described in claim 1, wherein said selected configuration is selected from the group consisting of tapes, ribbons and tubing.

6. The process described in claim 1, wherein said preform is paste extruded directly onto an electrical conductor.

7. The process described in claim 1, further including the step of sintering the material produced in step (f).

8. The process described in claim 7, further including the step of exposing the sintered material to laser radiation to encode said material.

9. The laser markable material produced by the process of claim 1.

10. The laser markable material produced by the process of claim 3.

11. The laser markable material produced by the process of claim 5.

12. The laser markable material produced by the process of claim 6.

13. A process for producing a laser markable material characterized by stable, high contrast markings that may be laser encoded substantially uniformly throughout the material, said process including the steps of:

(a) selecting $TiO_2$ particles having a rutile crystal structure, a purity greater than 90% and a mean particle size greater than 3 microns;

(b) tumbling 2 to 10 parts of the $TiO_2$ from step (a) with 100 parts of fine powder paste extrudable polytetrafluoroethylene resin to mix said $TiO_2$ particles with said polytetrafluoroethylene resin;

(c) air milling the mixture produced in step (b) to uniformly disperse the $TiO_2$ particles in the fine powder polytetrafluoroethylene resin;

(d) blending 100 parts of the milled mixture of step (c) with 10 to 25 parts of a hydrocarbon solvent so that the blend has a composition by weight of 2 to 9% $TiO_2$, 8–23% hydrocarbon solvent and the balance polytetrafluoroethylene resin;

(e) forming said blend into a preform suitable for paste extrusion; and (f) paste extruding said preform to produce a uniformly $TiO_2$-filled polytetrafluoroethylene resin laser markable material with a selected configuration.

14. The process described in claim 13, wherein said configuration is selected from the group consisting of tapes, ribbons and tubing.

15. The process described in claim 13, further including the step of sintering the material produced in step (f).

16. The process described in claim 15, further including the step of exposing the sintered material to laser radiation to encode said material.

17. The laser markable material produced by the process of claim 13.

18. The laser markable material produced by the process of claim 14.

* * * * *